July 10, 1956
J. G. FROEMEL
2,754,425
X-RAY MICROSCOPE
Filed Sept. 13, 1952
4 Sheets-Sheet 2
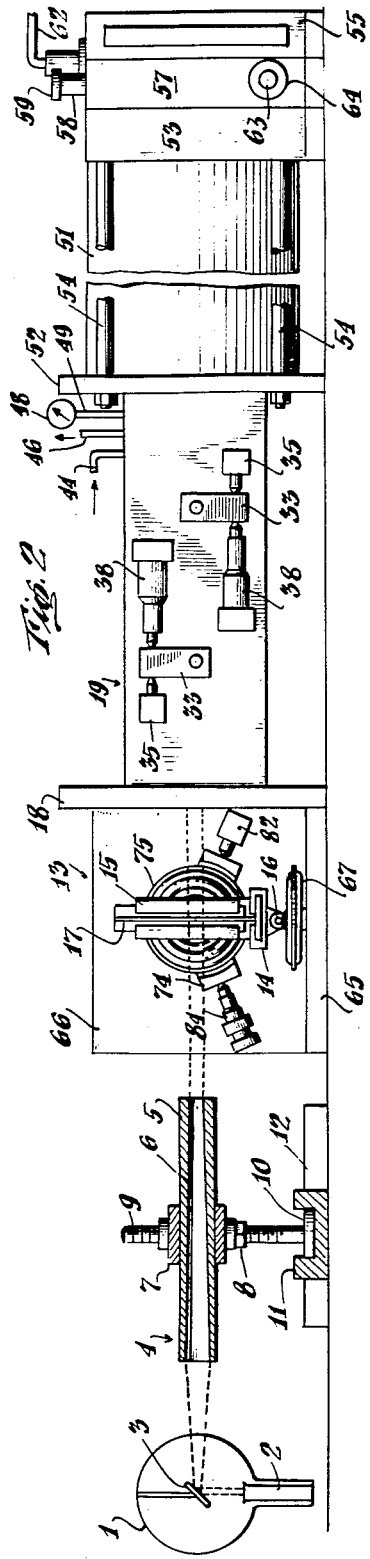
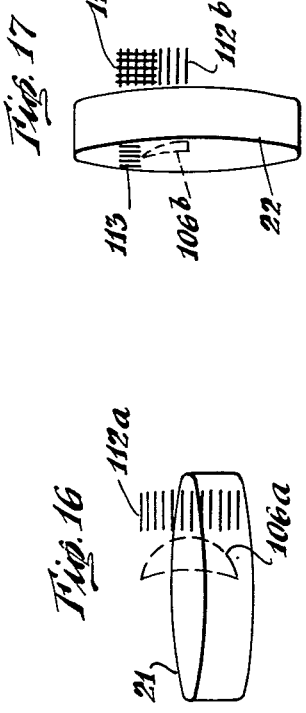
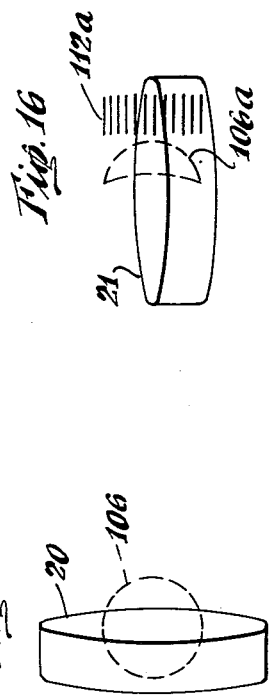
INVENTOR
John G. Froemel
BY Robert S. Dunham
ATTORNEY July 10, 1956      J. G. FROEMEL      2,754,425
X-RAY MICROSCOPE
Filed Sept. 13, 1952      4 Sheets-Sheet 3
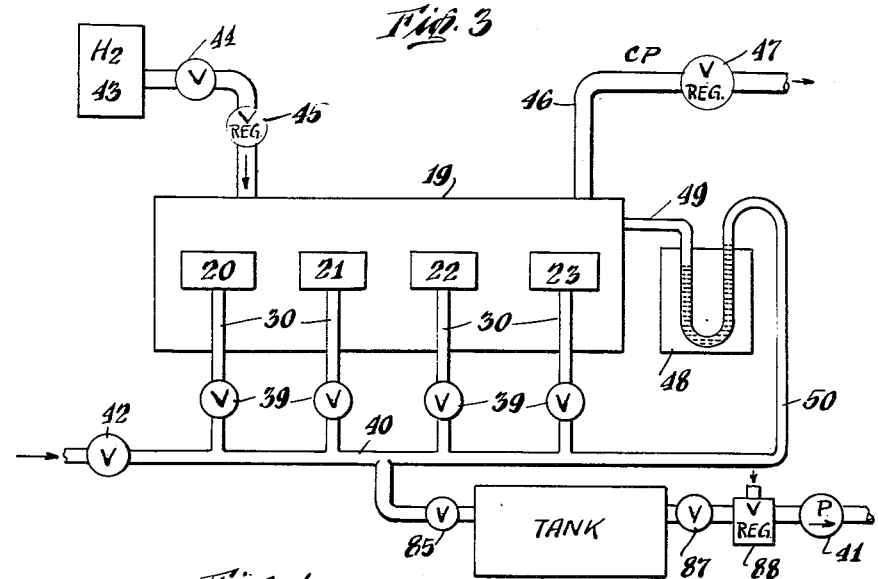
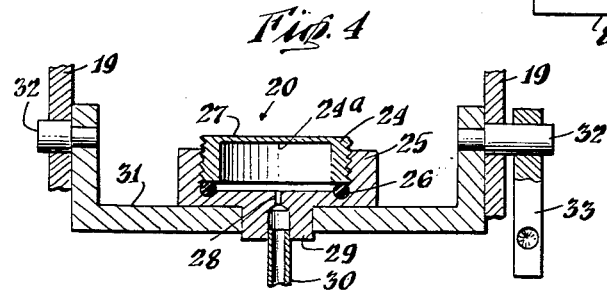
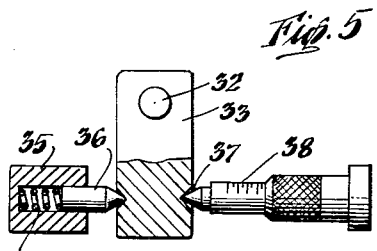
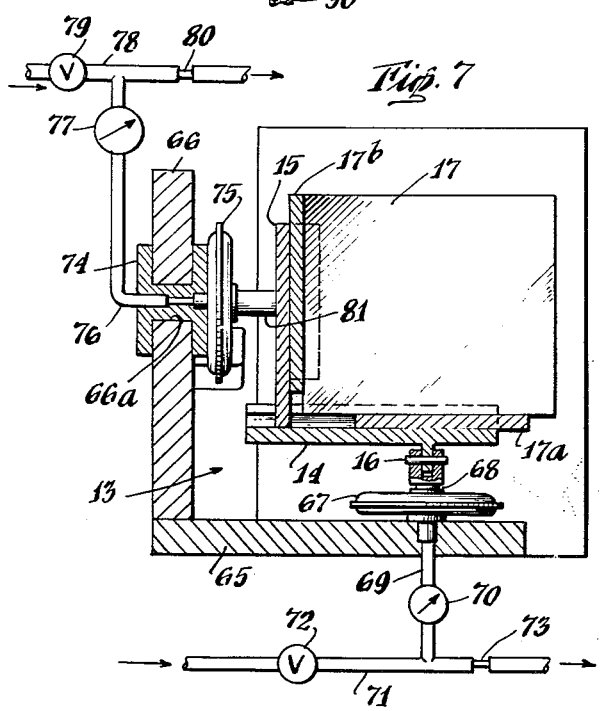
INVENTOR
John G. Froemel
BY Robert S. Dunham
ATTORNEY July 10, 1956  J. G. FROEMEL  2,754,425
X-RAY MICROSCOPE
Filed Sept. 13, 1952  4 Sheets-Sheet 4
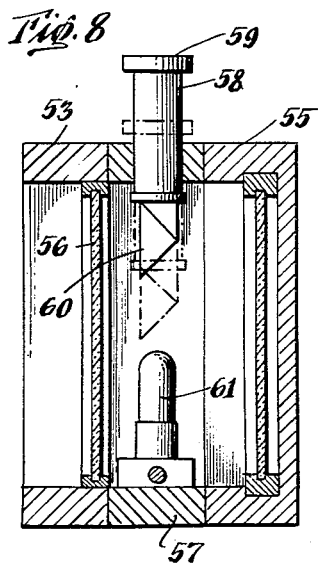
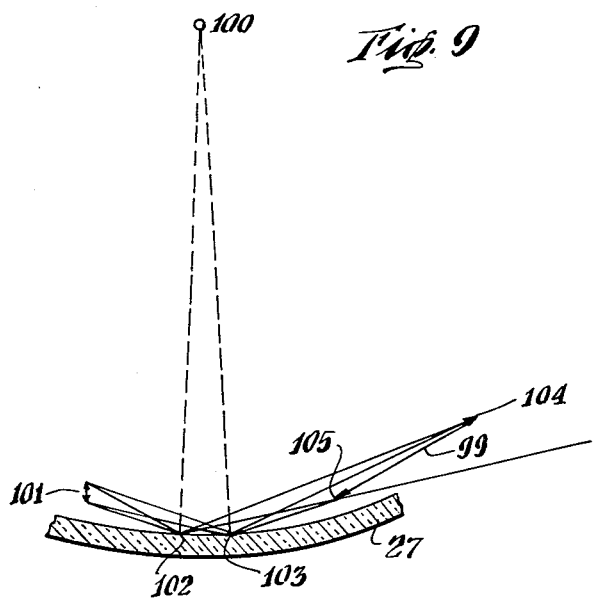
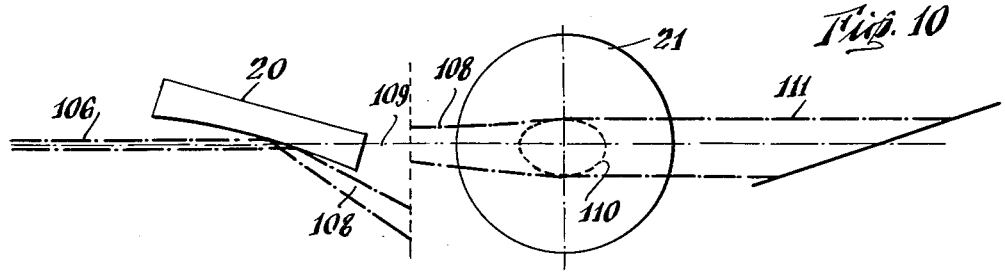
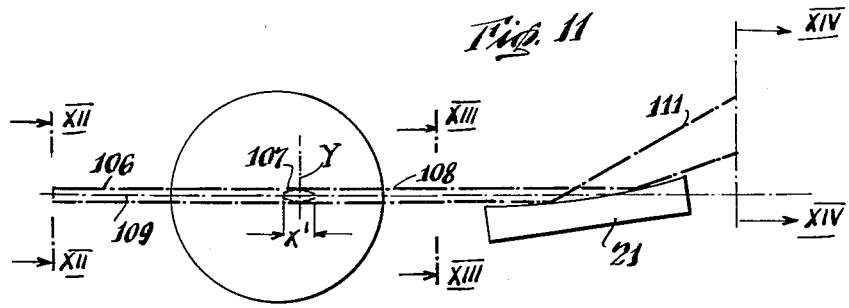
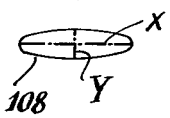
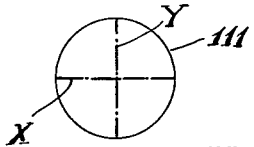
INVENTOR
John G. Froemel
BY Robert A. Dunham
ATTORNEY

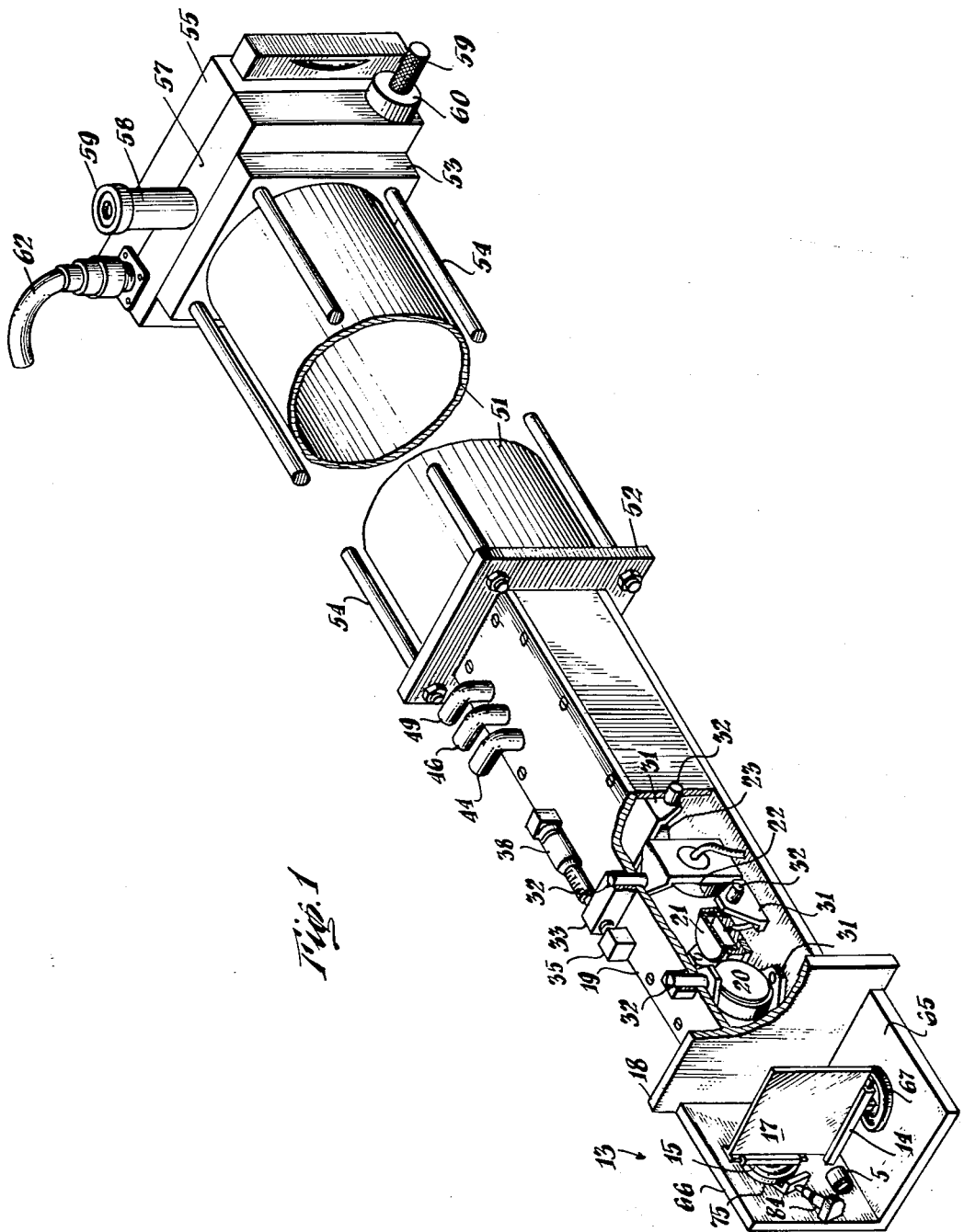

United States Patent Office 2,754,425
Patented July 10, 1956

2,754,425

X-RAY MICROSCOPE

John G. Froemel, Bloomfield, N. J.

Application September 13, 1952, Serial No. 309,537

10 Claims. (Cl. 250—53)

This invention relates to microscopes, and especially to microscopes capable of utilizing radiant energy having wave lengths less than 1,000 Angstrom units, such as, for example, X-rays. The invention will be described herein as applied to an X-ray microscope, although it may be used with radiations of shorter or longer wave lengths than X-rays.

It has long been recognized as desirable to construct an X-ray microscope, because of the great penetrating power of such rays and the theoretically high resolution of such a microscope. However, it was for many years considered impossible to focus X-rays, either by means of lenses, because of the very slight refraction of such rays, or by means of mirrors, because of the very high penetrating power of the rays which substantially prevented their reflection. In recent years, the theoretical possibility of focusing X-rays by means of reflectors has been recognized, in view of the fact that X-rays will reflect from surfaces of suitable material, if the rays impinge on the surface at grazing angles (angles of incidence greater than 89°).

The construction of such reflectors for use with X-rays presents great mechanical difficulties. If the theoretically possible high resolution of the microscope is to be actually attained, the reflecting surface must be formed smoothly with an accuracy of the same order as the resolution. This requires a tolerance of ±50 Angstrom units, or 100 A. depth between the highest peak and the lowest valley in the surface. Since an Angstrom unit is 1/100 millionth of a centimeter, it will be recognized that the formation of such a surface presents a problem of great mechanical difficulty. Furthermore, the radius of curvature of such a reflector is a substantial factor in determining the focal length of the reflector. For high magnifications, a long focal length is needed, and a consequent long radius of curvature. This radius of curvature must be held very closely to an accuracy whose order of magnitude is similar to that of the surface accuracy.

In addition to the mechanical difficulties of constructing such reflectors, it is known from the laws of optics that reflections from curved surfaces of light radiation incident thereon at grazing angles produce highly distorted images, which require careful correction if a usable image is to be obtained.

An object of the present invention is, therefore, to construct an improved microscope capable of utilizing radiant energy in the wave lengths shorter than the 1,000 Angstrom units.

Another object is to provide an improved reflector having a surface which is optically correct within a tolerance of ±50 Angstrom units.

A further object is to provide a curved reflector whose radius of curvature is maintained constant within limits of ±50 Angstrom units.

A further object is to provide an improved mounting for such a reflector, including improved means for accurately adjusting the angular position of the reflector with reference to rays impinging thereon.

Another object is to provide an improved optical system capable of focusing X-rays and producing a corrected image therefrom.

Another object is to provide an improved collimator for X-rays.

Another object is to provide an improved adjustable support for an object being viewed in an X-ray microscope.

Another object is to provide an improved structure for viewing or recording an image produced by an X-ray microscope.

A further object is to provide an improved apparatus for sensing the image produced by such a microscope, for use as an aid in the focusing and adjustment thereof.

The foregoing and other objects of the invention are attained by providing an optical system including a series of four concave spherical reflectors spaced along the axis of the optical system and having their centers substantially aligned with that axis. Each reflector is angularly movable about an axis of rotation perpendicular to the axis of the optical system and the axis of rotation of each successive reflector is angularly displaced 90° about the optical system axis from the axis of rotation of the preceding reflector in the series. Each of the four reflectors has a normal range of angular positions about its axis of rotation, in which range the angle between the optical system axis and the reflecting surface is of the order of 1° or less.

Each of the four reflectors is formed by the end surface of a generally cylindrical casing. The casing is hollow and the end wall on which the reflecting surface is formed is thin and yieldable so that the reflecting surface may be formed as a plane surface and later deflected into a concave surface by reducing the pressure in the interior of the casing below and external pressure. Means are provided for reducing the pressure in the interior of the casings of the four reflectors and for accurately controlling the pressures therein to vary their respective radii of curvature. The entire optical system, including the four reflectors, is located in a fluid-tight housing in which the pressure is closely regulated at a constant value.

An improved collimator is provided for directing a parallel beam of rays from a suitable source into the optical system described above. This collimator consists of a tube having an inner opening of circular cross-section converging toward the end nearest the optical system and having an angle of taper less than 1°.

A supporting structure for the object to be viewed is provided between the collimator and the optical system. The supporting structure is arranged so that the object may be adjusted horizontally or vertically or tilted in such a manner that any of its positions may be reproduced very accurately.

The image produced by the optical system is focused on an image-receiving structure including a fluorescent screen and/or a film or other photographically sensitive surface for making a record of the image. For the purpose of focusing the mirrors, an adjustable radiation-sensitive element is provided so that it can be moved around the image forming region until the image formed by invisible radiation is located.

Although the structure illustrated is intended particularly for use with X-rays, it may also be used with visible light or with short wave length radiations other than X-rays.

Other objects and advantages of the invention will become apparent upon a consideration of the following specification, taken together with the accompanying drawings, in which—

Fig. 1 is a perspective view of the principal parts of an X-ray microscope embodying the invention, with certain parts broken away;

Fig. 2 is a lengthwise, elevational view of the X-ray microscope of Fig. 1, with certain parts shown in section and others broken away;

Fig. 3 is a diagrammatic view showing a fluid pressure supply and control system for the housing and reflectors of the microscope;

Fig. 4 is a cross-sectional view of a single reflector of the type used in the microscope;

Fig. 5 is a detail view on an enlarged scale of the mechanism for angularly adjusting the reflector of Fig. 4;

Fig. 6 is a detail side elevational view showing the object supporting mechanism;

Fig. 7 is a view, partly in cross-section on the line VII—VII of Fig. 6, and partly diagrammatic, showing further details of the object supporting mechanism;

Fig. 8 is a vertical sectional view of the image viewing and recording mechanism;

Fig. 9 is a schematic view showing a single reflector of the type used in this microscope and illustrating the formation of an image by radiation impinging on the mirror at grazing incidence;

Fig. 10 is a schematic plan view of a portion of the optical system in the microscope of Figs. 1 and 2 showing the wave paths through the microscope, with some angles exaggerated for purposes of clarity;

Fig. 11 is a schematic elevational view similar to Fig. 8; and

Figs. 12 to 14 are schematic cross-sectional views of the beams of radiation in the microscope, taken respectively on the lines XII—XII to XIV—XIV of Fig. 11.

Figs. 15 to 18 are diagrammatic views, somewhat exaggerated, showing cross-sections of the beam of radiation as it approaches each of the four reflectors, in order.

Fig. 19 is a diagrammatic view, similar to Figs. 15–18, showing a cross-section of the radiation beam as it leaves the last reflector, and Fig. 20 is a diagrammatic view of the image formed on the screen or film at the image-receiving end of the microscope.

Referring to Fig. 2, there is shown a microscope including a source of X-rays such as a conventional X-ray tube 1 including an electron gun 2 directing cathode rays toward a target 3 from which X-rays radiate toward a collimator generally indicated at 4.

The collimator 4 includes a tube 5 having a convergent opening 6 therein. The angle of taper of this convergent opening should be less than 1°, in order that X-rays entering the larger end of the opening may reflect from its sides. The collimator tube 5 may be constructed by taking a cylindrical brass tube, inserting a tapered steel plug having the dimensions and contour of the desired opening, filling the space between the tube and the plug with molten lead, and withdrawing the plug after the lead cools.

The tube 5 is supported in a sleeve 7 carried by a bracket 8 on a vertical threaded post 9. The post 9 rests on a base 10 which is slidable in a direction perpendicular to the plane of the paper on a guide 11. The guide 11 is in turn slidable in a direction parallel to the plane of the paper between rails, one of which is shown at 12. It may be seen that with this structure, the collimator tube 5 is adjustable vertically or horizontally.

Rays emerging from the collimator tube 5 pass through an object supported on a frame generally indicated at 13. The frame 13 includes a vertically adjustable bottom support 14 and an upright 15 mounted for horizontal sliding movement on the support 14. The support 14 and the upright 15 are angularly tiltable as a unit about a pivot 16. The object to be viewed by the microscope, shown as a plate 17, is held in position by support 14 and upright 15. The supporting frame and related structures are more completely described below in connection with Figs. 6 and 7.

The frame 13 is aligned with the end plate 18 of a housing generally indicated at 19. The housing 19 encloses an optical system including a series of four reflectors 20, 21, 22 and 23 (see Fig. 1). These reflectors have their centers aligned with the axis of the optical system. Each reflector is angularly movable about an axis of rotation perpendicular to the optical system axis, and the axis of rotation of each reflector of the series is displaced 90° about the optical axis of the system from the axes of the preceding and following reflectors. The end plate 18 of casing 19 is provided with a window (not shown) aligned with the axis of the optical system and constructed of a material which minimizes the scattering of X-rays, such as beryllium.

The reflector 20 is shown in detail in Fig. 4. It includes a generally cylindrical casing formed by an inner cup-shaped member 24 having an external thread and an outer cup-shaped member 25 having an internal thread. These two members are threaded together with the closed end of the inner member 24 projecting outwardly beyond the open end of the outer member 25. A suitable gasket, such as a rubber O-ring 26, is located between the members 24 and 25 to make the space within them fluid-tight. The member 25 is grooved, as shown, to hold the O-ring tightly. The outer surface 27 of the inner member 24 forms the actual reflecting surface of the reflector. This member is preferably formed of some material which is capable of being machined within close tolerances. It is preferred to use tungsten carbide, although other very hard and tough materials may alternatively be used, such as tool steel, platinum-iridium alloys and rhodium. It is preferred to use a material having a Rockwell hardness of 45 or better. Such a material may be machined accurately to a plane which is flat within a tolerance of ±50 Angstrom units. In other words, the distance perpendicular to the plane surface between the highest "peak" and the lowest "valley" is not greater than 100 Angstrom units.

The outer cup-shaped member is provided with an aperture 28 through which the interior of the reflector casing 20 may be partially evacuated. The outer member 25 is provided with a fitting 29, projecting downwardly as viewed in Fig. 4. The fitting 29 communicates with the opening 28 and is adapted to receive the end of a flexible conduit 30.

When the interior of the reflector casing is at a lower pressure than the exterior, the end wall 24a is bent inwardly. If the wall 24a is thin and of constant thickness then the central portion of its outer surface is bent in substantially spherical form. If required, the thickness of wall 24a may be varied by contouring its inner surface, so that when the difference in pressures is applied, a reflector having some other concave contour is formed. If an elliptical reflector is desired, the wall 24a should be made thinner at the edges. If a paraboloid reflector is desired, the wall 24a should be made thinner at the center.

Each of the four reflectors, 20, 21, 22 and 23 is supported on a yoke 31. Each yoke 31 is in turn supported on a pair of oppositely projecting trunnions 32, which are journaled in the sides of the generally rectangular housing 19. At least one trunnion 32 on each yoke projects out through the housing 19. Arms 33 are fixed on each of these outwardly projecting trunnions for rotation therewith. Each arm 33 is biased in one direction by a spring 34 (Fig. 5) enclosed in a suitable retaining housing 35 and acting on a suitable bearing member 36 having a conical end received in a crater on one side of the arm 33. The spring 34 effectively holds another crater on the arm 33 against conical stop 37 which is provided with a differential screw type micrometer support 38. By adjusting the micrometer 38, which is preferably calibrated in one-hundredths of a degree, the angular position of the arm 33 and thereby of the reflector associated therewith may be accurately controlled.

As shown diagrammatically in Fig. 3, the flexible conduits 30 for each of the four reflectors 20, 21, 22 and 23 extend outwardly of the housing 19 and communicate through valves 39 with a manifold or main conduit 40, connected in the inlet of a pump 41. The manifold 40 is also provided with a manual inlet valve 42, whose inlet side is open to the atmosphere. The outlet end of manifold 40 is connected through a manual valve 85, a tank 86, a manual valve 87, a pressure regulator 88 and a conduit 89 to the inlet of a pump 41 which discharges to the atmosphere.

The interior of housing 19 is filled with hydrogen or helium from a supply under pressure, generally indicated at 43. Gas from source 43 flows through a manual valve 44 and a pressure regulating valve 45 to the interior of the housing 19, and out of the housing 19 through a conduit 46, and a flow regulating valve 47. The pressure regulating valve 45 may be of the Cartesian manostat type. Valve 47 serves to restrict the flow out of the casing and to maintain the pressure therein slightly greater than atmospheric. Hydrogen or helium is used in the casing 19 in order to minimize the scattering of X-rays, since those gases are well-known to have superior characteristics in this respect. If radiation having a wave length shorter than 1 Angstrom unit is employed, air may be used in casing 19, since the scattering effect of air on radiation of such wave lengths is negligible. Since the pressure in the casing 19 and in all parts of the hydrogen system is maintained greater than atmospheric, any leak will result in hydrogen flowing out rather than air flowing in.

The pressure in manifold 40 is set at a pressure substantially lower than the pressure in casing 19. The difference in pressure between the interior of the housing 19 and the manifold 40 may be measured by a suitable pressure gauge, such as the U-tube differential manometer shown at 48, one of whose arms is connected through the conduit 49 to the interior of housing 19, and whose other arm is connected through a conduit 50 to the manifold 40. The pressure in manifold 40 is preferably established by closing valve 85, setting the regulator 88, and running the pump 41 until the desired pressure is established in tank 86. Valve 87 is then closed and valve 85 opened, with valve 42 remaining closed. Tank 86 has sufficient capacity so that its pressure is not substantially affected by opening of valve 85. By manipulation of the valves 39, 42, 85 and 87 and the pressure regulator 88, the pressure in each of the reflectors 20, 21, 22 and 23 may be set as desired to give the respective reflectors their required curvatures. After the pressure in a reflector is set, its valve 39 is closed, and its curvature then remains constant.

It should be noted that in a reflector of the type described, the reflecting surface is completely rimless. It is essential that the surface be substantially rimless if it is to reflect radiation impinging at grazing incidence.

Rays emerging from the right hand end of casing 19 pass through an elongated glass sleeve 51 which is retained between a frame member 52 at the right hand end of the casing 19 and a frame member 53 on which the image-sensing apparatus is mounted. The frame members 52 and 53 are held in alignment by four rods 54, each of which is threaded at its respective ends to the frame members 52 and 53. The right end of casing 19 is open to the space within the sleeve 51, so that that space is filled with hydrogen.

The image-sensing mechanism includes a film holder 55, which may be of conventional construction, and a fluorescent screen 56, mounted within the frame member 53. Between the film holder 55 and the frame member 53 is located another frame member 57 which supports in its upper side a vertically slidable tube 58 carrying an eye-piece 59 at its outer end and a prism 60 at its lower end. By sliding the tube downwardly, the prism 60 is brought into alignment with the central part of the fluorescent screen 56, so that the image formed thereon may be viewed. When a photograph is to be made, the prism 60 may be retracted by sliding the tube 58 upwardly. There is also provided in frame 57 a radiation-sensitive tube 61, such as a suitable photo-multiplier tube, connected through suitable electric connections such as shown at 62 to a meter. The photo-sensitive tube is shiftable horizontally by means of a screw 63 and lock nut 64, so that the position of the tube may be adjusted until the reading of the meter connected at 62 is at a maximum. It is then known that the photo-multiplier tube is located in the field of the X-ray image.

Figs. 6 and 7 illustrate the object supporting frame 13. The frame 13 is mounted on a fixed base 65 and is provided with a fixed vertical wall 66. An expansible bellows 67 is fixed on the base 65 and has mounted on its upper side a post 68 which carries the pivot pin 16. The vertically adjustable support 14 is journaled on the pin 16 and is movable vertically by changing the pressure within the bellows 67. The interior of bellows 67 is connected through a conduit 69 and a pressure gage 70 to a conduit 71 connected through a pressure regulator 72 to a source of fluid under pressure and also connected through a fixed orifice 73 to a drain. By changing the setting of the regulator 72, the pressure in the conduit 71 and hence in the bellows 67 may be varied as desired. For each value pressure in bellows 67, the support 14 will have a different elevation. Consequently, the gage 70 may be calibrated in terms of the vertical position of the support 14.

The support 14 has a channel formed in its upper surface. The side flanges of the channel are bent over, as shown in Fig. 6. The plate 17, which forms the object of the microscope, is provided at its lower edge with flanges 17a which are received under the side flanges of the support 14. The end of the plate 17 nearest the upright 66 is provided with similar flanges 17b which are received in a similar channel formed on the upright 15.

The wall 66 is provided with an elongated arcuate slot 66a, concentric with the pivot pin 16. A carriage 74, of H-shape cross-section is slidably mounted in the slot 66a. A bellows 75 is mounted on the face of the carriage 74 and has its interior connected through a conduit 76 and a pressure gage 77 to a conduit 78 wherein the pressure is regulated by a regulator 79 and a fixed restriction 80. The bellows 75 supports a post 81 which carries the upright 15. By varying the pressure within the bellows 75, the object 17 may be moved horizontally throughout the range of travel permitted by the bellows 75. The gage 77 may be calibrated in terms of the horizontal position of the object plate 17.

The carriage 74 is biased toward the left end of the slot 66a, as it appears in Fig. 6, by a spring 82, which holds the opposite end of the carriage 74 against a stop 83 provided with a differential screw type micrometer support 84. Adjustment of micrometer 84 moves the carriage 74 along slot 66a and thereby tilts the whole assembly including the horizontal and vertical supports 14 and 15 about the pivot pin 16.

It may therefore be seen that the object plate 17 may be horizontally and vertically shifted, and that it may be tilted toward and away from the end of the collimating tube 5. Any given position may be recorded by noting the readings of the gages 70 and 77 and of micrometer 84, and the position may be reproduced by returning the micrometer to its reading and restoring the pressure conditions required to return the gages to their respective readings.

The applicant has constructed a microscope in accordance with the teachings of the present application. By way of example, the dimensions of various parts as used in the microscope are as follows:

The length of the collimator tube is preferably six inches. The minimum length is about three inches. It may be made longer or shorter than six inches, depending on the diameter of the beam available from the X-ray tube. The length should be such that the diameter of the beam issuing from the narrow end is about one millimeter, with the required 1° angle of taper.

The reflectors are all of approximately one inch in diameter. The spacing between the reflectors is made as small as possible. A spacing of one-ten thousandth inch between the reflector peripheries when they are all centered has been found satisfactory. Note that the angular swinging movement of the reflectors tends to increase the clearance space between them. The object is placed as close to the first reflector as possible. In the present example the spacing was approximately one inch. The spacing between the last reflector of the series and the screen on which the image is formed is of the order of thirty-nine inches.

Fig. 9 illustrates the formation of an image by means of light impinging on a concave reflecting surface 27 at a grazing angle. The angles and curvatures shown in this figure are exaggerated so as to make the figure intelligible and of reasonable size.

The center of curvature of the surface 27 is shown at 100. The object whose image is to be formed is illustrated as a vertical line 101. Rays from the opposite ends of the object 101 impinge on the mirror at points 102 and 103 and are reflected with angles of reflection equal to their angles of incidence, in accordance with the well-known law of reflection. The rays from the upper end of the object 101 converge again at the point 104, which represents the upper end of the image. The rays from the lower end of the object converge again at point 105, which represents the lower end of the image. It may be seen that the image, represented by a line 99 drawn between the points 104 and 105, is considerably magnified and tilted at a substantial angle with respect to the plane of the object 101. If the locations were graphically determined for points on the image 101 other than its two ends, it would become apparent that the image is a slightly curved line rather than a straight line. It, therefore, appears that the image is distorted in one sense by being tilted through a substantial angle, and in another sense by being curved instead of straight.

Furthermore, the image which would be formed of an object consisting of a horizontal line equal in length to line 101 intersecting that line and extending in a direction perpendicular to the plane of the paper would be subject neither to the same magnification as line 101 nor to the same distortion, since the rays from opposite ends of the line object would be reflected at the same angles.

From the foregoing, it appears that the image of the vertical line, such as the line 101, is magnified tremendously and distorted, while the image of a horizontal line of the same length perpendicular to line 101 is neither magnified, nor distorted. This difference in the image formation of the horizontal and vertical lines represents a further distortion of the astigmatic type which is in this case very great.

These distortions, which are characteristic of a single reflector of the type described, are overcome by the use of an optical system including a series of two such reflectors, as will be seen by reference to Figs. 10 to 14.

Figs. 10 and 11 show a beam of radiant energy 106 reflected successively from the reflectors 20 and 21. The beam 106 is an object pattern comprising a circle crossed by perpendicular diameters X and Y (see Fig. 12). The angles and the dimensions of the beam of rays in these figures are considerably exaggerated in order that an intelligible diagram may be drawn. The actual angles are very small, so that the difference in direction between the imaging and reflected rays would be hardly visible without such exaggeration.

The beam 106 will be described in its passage through the optical system as though it were a visible light beam rather than a beam of invisible radiation. The changes in the contour of an invisible beam will be substantially the same as those of the visible light beam, since both reflect from reflectors constructed in the manner disclosed in accordance with the same laws of optics.

The circular beam 106 impinging on the reflector 20 appears thereon as an elliptical spot 107 with its long axis horizontal and substantially parallel to the optical axis 109 of the system as shown in Fig. 11. The reflected beam from reflector 20 is shown at 108, and its cross-section as viewed in a plane perpendicular to the optical axis 109 is also elliptical, as shown in Fig. 13. It should be noted that the long axis of this ellipse is also horizontal, but longer than the long axis of the ellipse 107. This is caused by the fact that the spacing between the upper and lower rays in the beam 108 is substantially the same as the spacing between the upper and lower rays in the beam, whereas the spacing between the left and right hand rays has been increased due to the magnifying effect of the reflector 20. In other words, line X has been magnified by reflector 20 but line Y has not. The cross-sectional view shown in Fig. 13 is not an accurate representation of the actual beam as it exists on the plane identified by the line XIII—XIII in Fig. 11. It represents rather the image which would be formed by these rays at the location where they would focus if no further optical elements were introduced in their path.

In Fig. 10, the angle of reflector 20 with respect to axis 109 is exaggerated. To compensate for that exaggeration, the beam 108 is broken between reflectors 20 and 21, and is shown impinging on reflector 21 in substantially its proper direction, i. e., nearly parallel to axis 109.

The beam 108 impinging on the horizontal reflector 21 forms an ellipse 110 whose dimension parallel to the optical axis 109 is magnified as compared to the corresponding dimension of beam 108. In other words, line Y is magnified by impinging on reflector 21 at the angle shown. This beam is reflected from mirror 21 as a beam 111. Line X on the object which was magnified by the reflector 20 is reflected without magnification by the reflector 21. Similarly, line Y in the object which was not magnified by the mirror 20 is magnified by reflector 21. The result is that both the horizontal and vertical lines in the object have now been magnified in substantially equal amounts, so that the beam 111, if allowed to proceed to the location where it focuses as an image, would produce an image of the form illustrated at 111 in Fig. 14. The two mirrors 20 and 21 together provide the necessary astigmatic correction of the image.

Figs. 15 to 20 illustrate the function of the four successive reflectors 20 to 23. These views are all taken on planes perpendicular to the optical axis of the microscope. Fig. 15 shows a beam of radiation 106 of circular cross-section impinging on the first reflector 20. Since the beam is of greater diameter than the projected area of reflector 20 which intercepts it, a portion of the beam 106 passes the reflector 20 without impinging on it. This portion is shown at 106a in Fig. 16. Another portion of the beam 106 is reflected by reflector 20 and is represented in Fig. 16 by a series of horizontal lines 112a. Horizontal lines are used to indicate that only horizontal lines have been magnified by the first reflector. The remainder of the beam 106, as it appears in Fig. 15, impinges on the side of the reflector structure and is either absorbed or scattered by that structure so that it can be neglected as far as any further effect on the image produced by the microscope is concerned.

The radiation impinging on the reflector 21, as shown in Fig. 16, consists of a generally crescent shaped unreflected beam 106a and a reflected and horizontally magnified beam 112a. Only portions of the beams 106a and 112a are reflected by reflector 21. The upper portions of the beams 106a and 112a pass the reflector 21 without impinging thereon. These portions are shown at 106b and 112b in Fig. 17. Other portions of the beams 106a and 112a impinge on the reflecting surface of reflector 21 and are reflected upwardly thereby. In these reflected portions of the beam the vertical lines are magnified. These reflected beams are illustrated at 113 and 114 in Fig. 17. Note that in the beam 114, both the horizontal and vertical lines have been magnified, so that the beam 114 represents a corrected image. In beam 113, only the vertical lines have been magnified, so it is represented by a series of vertical lines. The lower portions of the beams 106a and 112a in Fig. 16 strike the side of the reflector 21 and are either absorbed or scattered.

The beams 112b and 114 were reflected to the right by the reflector 20, so that they appear in Fig. 17 to the right of the reflector structure 22 and pass it without impinging thereon. The beams 106b and 113 impinge on the reflecting surface of reflector 22 and are reflected by it at a slight angle to the left. In this reflection, the horizontal lines are magnified.

The beams 114 and 112b approach the reflector 23 (Fig. 18) in the same relative positions which they had in Fig. 17, as is shown in Fig. 18. The beam 106b of Fig. 17 is converted by reflector 22 to the beam 106c (Fig. 18) having horizontal lines only magnified. The beam 113 of Fig. 17 is converted by reflector 22 to the beam 113a of Fig. 18, having both horizontal and vertical lines magnified.

The beams 113a and 114 of Fig. 18 have been reflected upwardly by reflector 21 so that they pass behind the reflector 23 without impinging on it. The beams 106c and 112b impinge on the reflecting surface of reflector 23 and are reflected downwardly thereby, and have their vertical lines magnified. These beams then appear as shown in Fig. 19 at 106c and 112d respectively. The beams 113a and 114 remain unchanged between Figs. 18 and 19. The entire array of beams in Fig 19 consists of four segments or quadrants, which are separated in space and which have been magnified both horizontally and vertically. These beams continue on, spreading as they go because of the magnifying effect, until they impinge on the screen at the end of the microscope, producing the pattern shown in Fig. 20. The four quadrants there join together to form a single complete field, each quadrant of which has been reflected from two and only two of the four reflectors.

It will be readily understood that two, or an even number of reflectors will produce a satisfactory beam at least portions of which are undistorted. Any odd number of reflectors will produce a beam having portions which are distorted either horizontally or vertically. For some purposes, it may be desired to distort the image produced and for that reason it may be desired to use an odd number of reflectors. More typically, however, it will be desired to produce an undistorted image and an even number of reflectors will therefore be commonly used. Since four reflectors produce a field which is completely undistorted, it is preferred to use that number.

While I have shown and described a preferred embodiment of my invention, many modifications of that embodiment within the scope of the invention will readily occur to those skilled in the art. For example, many pressure regulation systems equivalent to the one disclosed may be devised. It may in some cases be desirable to reverse the pressure differential to make the reflectors, or some of them, convex instead of concave. Furthermore, while the theory set forth herein represents my present understanding of the operation of the optical system, that theory may be subject to correction as my understanding of the system is improved through experimentation, and also may require a modification as the conditions of operation vary. For example, if the diameter of the impinging beam is less than the minor axis of the elliptical projection of the reflector surface 20 as it appears in Fig. 15, a corresponding revision of Figs. 16 to 20 would be necessary. As another example, if the wave length of the radiation is such that part of it passes through the reflector 20, the theory applied to the succeeding Figures 16 to 20 would have to be revised. Because of the foregoing and similar considerations, I intend my invention to be limited only by the appended claims.

I claim:

1. An optical system capable of focusing radiation having wave lengths in the range shorter than 1,000 Angstrom units, including a series of at least two concave reflectors spaced along an optical system axis and having their centers substantially aligned with said axis, means supporting each said reflector for angular movement about an axis of rotation perpendicular to said optical system axis, the axis of rotation of each successive reflector being angularly displaced substantially 90° about said optical system axis from the axis of rotation of the reflector preceding it in said series, each said reflector having a normal range of angular position about its axis of rotation in which the angle between said optical system axis and the reflecting surface is less than 1°; each said reflector comprising a closed cylindrical casing having a resilient end wall with an outer surface which is substantially plane when said wall is unstressed, and means to maintain the pressure within said casing at a value different from the external pressure so that said wall is deflected by the difference between the external and internal pressures acting thereon, and said external surface becomes curved; and an image sensing device aligned with said optical system to receive an image reflected from said reflectors.

2. An optical system as defined in claim 1, in which said casing pressure maintaining means for said reflectors comprises a vacuum pump, a conduit system connected to the inlet of said pump including a main conduit, a plurality of separate branch conduits, each connected to the interior of one of said reflector casings, a valve in each said branch conduit, and valve means operable to connect said main conduit to a source of fluid under pressure.

3. An optical system as defined in claim 1, including a fluid-tight housing enclosing said reflectors, and means to maintain said housing filled with hydrogen under a substantially constant pressure greater than atmospheric pressure.

4. An optical system as defined in claim 1, including means operable to set each said reflector at any angular position within its normal range.

5. An optical system as defined in claim 1, in which each said reflector supporting means comprises a yoke supporting its associated reflector casing centrally thereof, and trunnions pivotally supporting the ends of said yoke and aligned with the axis of rotation of its associated reflector; and including an arm connected to one of said trunnions for concurrent angular movement therewith, a spring biasing said arm in one direction, and settable stop means to limit the movement of said arm by said spring and thereby to establish the reflector at any angular position within its normal range with reference to its axis of rotation.

6. A reflector capable of reflecting radiant energy having wave lengths shorter than 1000 Angstrom units, comprising a closed, generally cylindrical, hollow casing formed of metal having a Rockwell hardness of at least 45 and having a resilient wall at one end, said one end of the casing terminating in a substantially rimless surface formed at least in part by the external surface of said wall, said surface being substantially plane when said wall is unstressed, means to maintain the pressure in said casing at a value different from the external pressure and thereby to deflect said wall by an amount determined by the difference between the external and internal pressures acting thereon, so that said external surface becomes curved, and means supporting said casing with said surface at an angle of les than 1° with respect to the incident radiant energy.

7. A reflector as defined in claim 6, in which said casing comprises an outer cup-shaped member having an internal thread and an inner cup-shaped member having an external thread and threadedly received within said outer member with its closed end projecting outwardly beyond the open end of the outer member, said closed end of said inner member being resilient and forming said resilient wall.

8. A reflector as defined in claim 6, including a fluid-tight housing enclosing said reflector, and means for maintaining a substantially constant fluid pressure in said housing.

9. A reflector as defined in claim 6, in which said resilient wall is of uniform thickness, so that its external surface becomes spherically curved upon deflection of the wall by said difference of pressures.

10. A reflector as defined in claim 6, including a fluid-tight housing enclosing said reflector, a source of a gas under superatmospheric pressure, said gas having a low radiation scattering effect, means for supplying gas from said source to said housing at a substantially constant pressure greater than atmospheric, means for maintaining the fluid within said casing at a pressure lower than said constant pressure, and means for varying the pressure in said casing to vary the curvature of said external surface.

References Cited in the file of this patent

UNITED STATES PATENTS

| | | |
|---|---|---|
| 796,254 | Hartmenn | Aug. 1, 1905 |
| 1,213,613 | Fritts | Jan. 23, 1917 |
| 1,714,443 | Pineschi et al. | May 21, 1929 |
| 2,514,791 | Parrish et al. | July 11, 1950 |
| 2,540,821 | Harker | Feb. 6, 1951 |
| 2,557,096 | Golay | June 19, 1951 |
| 2,557,662 | Kirkpatrick | June 19, 1951 |
| 2,653,249 | Harker | Sept. 22, 1953 |
| 2,666,147 | Borst | Jan. 12, 1954 |

OTHER REFERENCES

X-Ray Microscope, Electronics, March 1950, pages 196, 198 and 200.